(12) United States Patent
Duong et al.

(10) Patent No.: US 7,291,696 B2
(45) Date of Patent: *Nov. 6, 2007

(54) COMPOSITION AND ASSOCIATED METHOD

(75) Inventors: Hieu Minh Duong, Clifton Park, NY (US); Daniel Steiger, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 146 days.

This patent is subject to a terminal disclaimer.

(21) Appl. No.: 11/267,849

(22) Filed: Nov. 4, 2005

(65) Prior Publication Data

US 2007/0106052 A1    May 10, 2007

(51) Int. Cl.
*C08F 6/00* (2006.01)

(52) U.S. Cl. .................. 528/499; 264/117; 264/127; 524/268; 524/390; 524/546; 525/100; 525/102; 528/174; 528/491

(58) Field of Classification Search ............... 264/117, 264/127; 524/268, 390, 546; 525/100, 102; 528/174, 491, 499
See application file for complete search history.

(56) References Cited

U.S. PATENT DOCUMENTS

| | | | |
|---|---|---|---|
| 4,113,912 A | 9/1978 | Okita | |
| 4,189,369 A | 2/1980 | Fang | |
| 4,193,138 A | 3/1980 | Okita | |
| 4,194,041 A | 3/1980 | Gore et al. | |
| 4,247,401 A | 1/1981 | Bloch et al. | |
| 4,318,714 A | 3/1982 | Kimura et al. | |
| 4,419,187 A | 12/1983 | Cheng et al. | |
| 4,466,931 A | 8/1984 | Tanny | |
| 4,477,634 A | 10/1984 | Linder et al. | |
| 4,525,374 A | 6/1985 | Vaillancourt | |
| 4,584,103 A | 4/1986 | Linder et al. | |
| 4,604,204 A | 8/1986 | Linder et al. | |
| 4,655,807 A | 4/1987 | Ohmori et al. | |
| 4,659,474 A | 4/1987 | Perry et al. | |
| 4,690,765 A | 9/1987 | Linder et al. | |
| 4,690,766 A | 9/1987 | Linder et al. | |
| 4,720,345 A | 1/1988 | Linder et al. | |
| 4,753,725 A | 6/1988 | Linder et al. | |
| 4,767,645 A | 8/1988 | Linder et al. | |
| 4,776,959 A | 10/1988 | Kasai et al. | |
| 4,778,596 A | 10/1988 | Linder et al. | |
| 4,798,871 A | 1/1989 | Lai et al. | |
| 4,833,014 A | 5/1989 | Linder et al. | |
| 4,889,636 A | 12/1989 | Perry et al. | |
| 4,911,844 A | 3/1990 | Linder et al. | |
| 5,024,765 A | 6/1991 | Linder et al. | |
| 5,028,337 A | 7/1991 | Linder et al. | |
| 5,032,282 A | 7/1991 | Linder et al. | |
| 5,039,421 A | 8/1991 | Linder et al. | |
| 5,041,225 A | 8/1991 | Norman | |
| 5,049,275 A | 9/1991 | Gillberg-LaForce et al. | |
| 5,049,282 A | 9/1991 | Linder et al. | |
| 5,087,338 A | 2/1992 | Perry et al. | |
| 5,090,422 A | 2/1992 | Dahl et al. | |
| 5,130,024 A | 7/1992 | Fujimoto et al. | |
| 5,151,182 A | 9/1992 | Perry et al. | |
| 5,156,780 A | 10/1992 | Kenigsberg et al. | |
| 5,209,850 A | 5/1993 | Abayasekara et al. | |
| 5,302,127 A | 4/1994 | Crisio, Jr. | |
| 5,304,307 A | 4/1994 | Linder et al. | |
| 5,354,587 A | 10/1994 | Abayasekara | |
| 5,430,099 A | 7/1995 | Linder et al. | |
| 5,539,072 A | 7/1996 | Wu | |
| 5,597,863 A | 1/1997 | Linder et al. | |
| 5,599,506 A | 2/1997 | Linder et al. | |
| 5,716,660 A | 2/1998 | Weadock et al. | |
| 5,755,762 A | 5/1998 | Bush | |
| 5,897,955 A | 4/1999 | Drumheller | |
| 5,902,745 A | 5/1999 | Butler et al. | |
| 6,018,819 A | 2/2000 | King et al. | |
| 6,179,132 B1 | 1/2001 | Moya | |
| 6,228,477 B1 | 5/2001 | Klare et al. | |
| 6,261,678 B1 | 7/2001 | von Fragstein et al. | |
| 6,273,271 B1 | 8/2001 | Moya | |
| 6,331,351 B1 | 12/2001 | Waters et al. | |
| 6,354,443 B1 | 3/2002 | Moya | |
| 6,395,383 B1 | 5/2002 | Maples | |
| 6,403,726 B1 | 6/2002 | Ward | |
| 6,410,084 B1 | 6/2002 | Klare et al. | |
| 6,603,055 B2 | 8/2003 | Mitchell et al. | |

(Continued)

FOREIGN PATENT DOCUMENTS

| | | |
|---|---|---|
| EP | 0 456 939 | 11/1991 |
| EP | 0 498 348 | 8/1992 |
| WO | WO94/11772 | 5/1994 |
| WO | WO 95/13859 | 5/1995 |
| WO | WO 96/03202 | 2/1996 |
| WO | WO 96/08149 | 3/1996 |
| WO | WO 96/20040 | 7/1996 |

(Continued)

OTHER PUBLICATIONS

European Search Report dated Feb. 1, 2007.

(Continued)

*Primary Examiner*—Terressa Boykin
(74) *Attorney, Agent, or Firm*—Shawn A. McClintic; William E. Powell, III

(57) ABSTRACT

Provided is a fluorine substituted oligomeric or polymeric ester including the reaction product of a fluorine substituted acrylate or a fluorine substituted methacrylate; an unsaturated anhydride; and an alkyl acrylate or an alkyl methacrylate. Also provided is a method of making the composition.

33 Claims, 2 Drawing Sheets

U.S. PATENT DOCUMENTS

| | | |
|---|---|---|
| 6,676,993 B2 | 1/2004 | Klare |
| 6,752,847 B2 | 6/2004 | Smithies |
| 6,854,603 B2 | 2/2005 | Klare |
| 2003/0091750 A1 | 5/2003 | Chen |
| 2004/0043224 A1 | 3/2004 | Sternberg |

FOREIGN PATENT DOCUMENTS

| | | |
|---|---|---|
| WO | WO03/033557 | 4/2003 |
| WO | WO 03/101505 | 12/2003 |

OTHER PUBLICATIONS

European Search Report dated Jan. 4, 2007.

Beatrice Haimovich et al., "A New Method for Membrane Construction on ePTFE Vascular Grafts: Effect on Surface Morphology and Platelet Adhesion", Correspondence to: B. Haimovich, Contract Grant Sponsor: Cardiovascular Institute at Robert Wood Johnson Medical School, pp. 1393-1400, 1997.

Mikhail Kozlov et al., "Adsorption of Poly(vinyl alcohol) Onto Hydrophobic Substrates. A General Approach for Hydrophilizing and Chemically Activating Surfaces", Macromolecules, vol. 36, pp. 6054-6059, Jul. 2003.

T. Tokiwa et al., "Restoration of Differentiated Functions in Multicellular Aggregates of a Human Liver Epithelial Cell Line", Materials Science and Engineering, vol. C 6, pp. 249-252, 1998.

Roki Techno Co. Ltd, Certainpore PTFE CT, 2 pages, Data Sheet made Jan. 2005.

Werner Mormann et al., "Copolymers From tert-butyl Methacrylate and Itaconic Anhydride—Reactivity Ratios and Polymer Analogous Reactions", European Polymer Journal, Elsevier Science Ltd., vol. 39, pp. 489-496, 2003.

Hai-Hu Qin et al., "Preparation of Poly(methyl acrylate-co-itaconic anhydride)/$SiO_2$ Hybrid Materials via the Sol-Gel Process—The Effect of the Coupling Agent, Inorganic Content, and Nature of the Catalyst", Journal of Polymer Science: Part A: Polymer Chemistry, vol. 38, pp. 321-328, 2000.

COMPOSITION AND ASSOCIATED METHOD

BACKGROUND

1. Technical Field

The invention includes embodiments that may relate to a membrane. The invention includes embodiments that may relate to method of making the membrane. The invention includes embodiments that may relate to a composition for use with the membrane.

2. Discussion of Related Art

Membranes with a high porosity, wetability, and chemical resistance may be useful in, for example, liquid size exclusion filtration applications. Polytetrafluoroethylene (PTFE) may be desirable for its chemical resistance, and expanded PTFE (ePTFE) may be desirable for both chemical resistance and porosity. However, due to the hydrophobic property of PTFE, liquid water filtration is problematic and may require treatment.

Hydrophilicity, and consequently biocompatibility, may be imparted to an ePTFE membrane by, for example, impregnation using a tetrafluoroethylene/vinyl alcohol copolymer. Such an approach leverages the chemical affinity of the perfluoropolymer in the coating material to the perfluoropolymer of the ePTFE. However, the affinity may be sufficiently low that hydrophilicity is of an undesirably short duration. A porous fluoropolymeric membrane having continuous pores for one side to the other may be rendered hydrophilic by coating the membrane interior with a mixture of a fluoroaliphatic surfactant and a hydrophilic but water insoluble polyurethane. Such an approach may leverage the chemical affinity between the perfluoropolymers to form a two-layer system.

In another approach, hydrophilicity of PTFE membrane may be produced by irradiation treatment of the PTFE powdered resin. The resin may be processed with a porogen and virgin PTFE powder to render a microporous PTFE membrane.

With reference to the above-disclosed methods, there are commercially available hydrophilic ePTFE membranes used for liquid water filtration. In addition to the problematic production considerations, these membranes may be prewetted by membrane manufacturers and shipped wet to end-users. Such a membrane may dewet (dry). The drying of the membrane may render it ineffective and may present, for example, undesirable shipping considerations. Other undesirable aspects may include economic considerations such as handling, shipping weight, and the like.

It may be desirable to have a membrane with properties that differ from those properties of currently available membranes. It may be desirable to have a membrane produced by a method that differs from those methods currently available.

BRIEF DESCRIPTION

The invention provides in one embodiment, a composition including a terpolymer having the structure of formula (I)

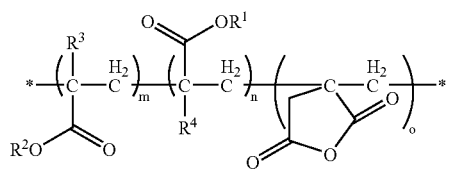

(I)

wherein R1 comprises an alkyl radical; R2 comprises of a formula $CF_3(CF_2)_p(CH_2)_q$- wherein "p" is an integer in a range of from 1 to about 21, and "q" is an integer in a range of from 1 to about 10; R3 and R4 are separately hydrogen or a short chain alkyl; and "m" is an integer greater than 1, "n" is an integer greater than about 2 to about 20,000, and "o" is an integer greater than about 2.

The invention provides in one embodiment, a fluorine substituted oligomeric or polymeric ester including the reaction product of a fluorine substituted acrylate or a fluorine substituted methacrylate; an unsaturated anhydride; and an alkyl acrylate or an alkyl methacrylate.

The invention provides in one embodiment, a method, that includes reacting a fluorine substituted acrylate or a fluorine substituted methacrylate; an unsaturated anhydride; an alkyl acrylate or an alkyl methacrylate; and an initiator in a solvent.

The invention provides in one embodiment, a copolymer comprising polyether imide or a polysulfone, and the composition including a terpolymer having the structure of formula (I).

The invention provides in one embodiment, a cross-linked material formed from the composition including a terpolymer having the structure of formula (I).

DETAILED DESCRIPTION

Figure 1:
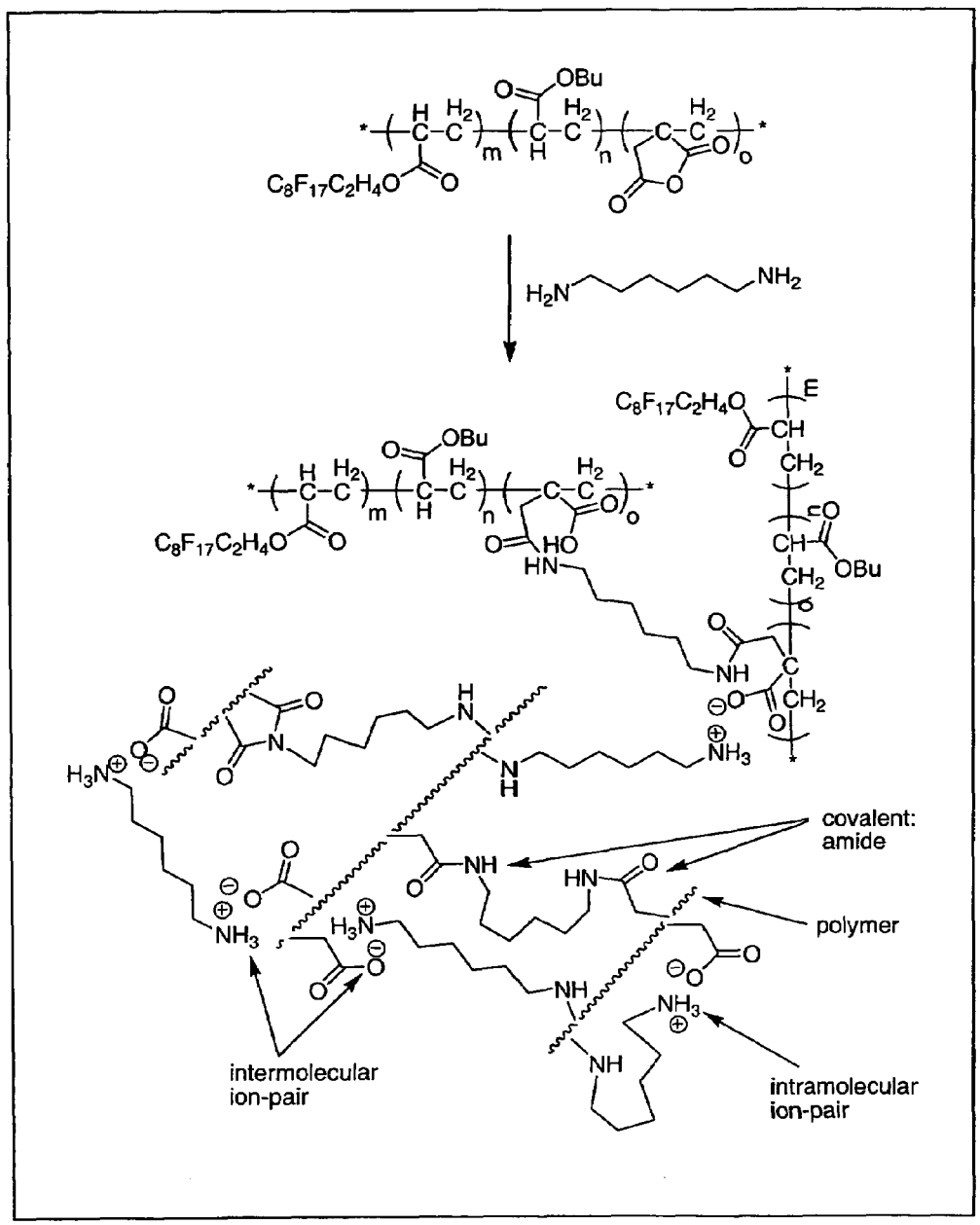
FIG. 1 is a chemical reaction scheme illustrating the use of a composition in accordance with an embodiment of the invention.

The invention includes embodiments that may relate to a composition. The composition may be used with a membrane. The invention includes embodiments that may relate to the membrane. The invention includes embodiments that may relate to method of making and/or using the composition, the membrane, or both.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value. Similarly, "free" may be combined with a term; and, may include an insubstantial number, or a trace amount, while still being considered free of the modified term.

A composition according to an embodiment of the invention for use with a membrane may include a terpolymer. Suitable terpolymers may include a fluorine substituted oligomeric or polymeric ester. The fluorine substituted oligomeric or polymeric ester may include the reaction product of a fluorine substituted acrylate or fluorine substituted methacrylate; an unsubstituted anhydride; and an alkyl acrylate or alkyl methacrylate.

Suitable fluorine substituted acrylate or fluorine substituted methacrylate may have a fluorine substituted aliphatic or aromatic radical. In one embodiment, the fluorine substituted acrylate may consist essentially of 3,3,4,4,5,5,6,6,7,7,8,8,9,9,10,10,10-heptadecafluorodecyl acrylate. In one embodiment, the fluorine substituted acrylate may be present in an amount in a range of greater than about 20 mole percent, or in an amount of about 25 mole percent.

Suitable unsubstituted anhydride may include one or both of itaconic anhydride or maleic anhydride. In one embodiment, the unsubstituted anhydride consists essentially of itaconic anhydride. In one embodiment, the unsubstituted anhydride consists essentially of maleic anhydride. In one embodiment, the unsubstituted anhydride may be present in an amount in a range of greater than about 20 mole percent, or in an amount of about 25 mole percent.

In one embodiment, the composition may have a structure as defined in formula (I):

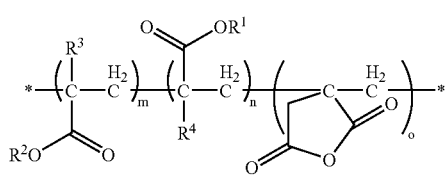

(I)

wherein R1 may include an aliphatic or aromatic radical, R2 may include a fluorine substituted aliphatic or aromatic radical, and R3 and R4 may be separately either hydrogen or a short chain alkyl, such as methyl. The term "m" may be an integer greater than 1, or in a range of from 1 to about 10,000, "n" may be an integer greater than 2, or in a range of from about 2 to about 20,000, and "o" may be an integer greater than 2, or in a range of from about 2 to about 20,000.

In one embodiment, R2 may be represented by the formula $CF_3(CF_2)_p(CH_2)_q$— wherein "p" is an integer greater than 1, or in a range of from 1 to about 21, and "q" is an integer greater than 1, or in a range of from 1 to about 10.

The term polymer may include a reaction product of polymerization; the polymerization product may include all chemical reaction products comprising one or more repeated units derived from a reactive substrate that is lower in molecular weight than the reaction product. Examples of polymerization products may include one or more of homopolymers, heteropolymers, random copolymers, interpolymers, terpolymers, block copolymers, graft copolymers, alternating copolymers, addition polymers, and the like. In one embodiment, the reaction product may be produced by reaction in the presence of an initiator in solution. A suitable initiator may include an azo-based free radical polymerization initiator.

Aliphatic radical or aliphatic moiety, interchangeably, may be an organic radical having at least one carbon atom, a valence of at least one and may be a linear array of atoms. Aliphatic radicals may include heteroatoms such as nitrogen, sulfur, silicon, selenium and oxygen or may be composed exclusively of carbon and hydrogen. Aliphatic radical may include a wide range of functional groups such as alkyl groups, alkenyl groups, alkynyl groups, halo alkyl groups, conjugated dienyl groups, alcohol groups, ether groups, aldehyde groups, ketone groups, carboxylic acid groups, acyl groups (for example, carboxylic acid derivatives such as esters and amides), amine groups, nitro groups and the like. For example, the 4-methylpent-1-yl radical may be a $C_6$ aliphatic radical comprising a methyl group, the methyl group being a functional group, which may be an alkyl group. Similarly, the 4-nitrobut-1-yl group may be a $C_4$ aliphatic radical comprising a nitro group, the nitro group being a functional group. An aliphatic radical may be a haloalkyl group that may include one or more halogen atoms, which may be the same or different. Halogen atoms include, for example; fluorine, chlorine, bromine, and iodine. Aliphatic radicals having one or more halogen atoms may include the alkyl halides: trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —$CH_2CHBrCH_2$—), and the like. Further examples of aliphatic radicals may include allyl, aminocarbonyl(—$CONH_2$), carbonyl, dicyanoisopropylidene —$CH_2C(CN)_2$$CH_2$—), methyl(—$CH_3$), methylene (—$CH_2$—), ethyl, ethylene, formyl(—CHO), hexyl, hexamethylene, hydroxymethyl(—$CH_2OH$), mercaptomethyl(—$CH_2SH$), methylthio (—$SCH_3$), methylthiomethyl(—$CH_2SCH_3$), methoxy, methoxycarbonyl($CH_3OCO$—), nitromethyl(—$CH_2NO_2$), thiocarbonyl, trimethylsilyl(($CH_3)_3Si$—), t-butyldimethylsilyl, trimethoxysilylpropyl(($CH_3O)_3SiCH_2CH_2CH_2$—), vinyl, vinylidene, and the like. By way of further example, a "$C_1$-$C_{30}$ aliphatic radical" contains at least one but no more than 30 carbon atoms. A methyl group ($CH_3$—) may be an example of a $C_1$ aliphatic radical. A decyl group ($CH_3$($CH_2)_9$—) may be an example of a $C_{10}$ aliphatic radical.

A cycloaliphatic radical or cycloaliphatic moiety, interchangeably, may be an organic radical having a valence of at least one, and having an array of atoms, which may be cyclic but which may not be aromatic. A cycloaliphatic radical may include one or more non-cyclic components. For example, a cyclohexylmethyl group ($C_6H_{11}CH_2$—) may be a cycloaliphatic radical, which may include a cyclohexyl ring (the array of atoms, which may be cyclic but which may not be aromatic) and a methylene group (the noncyclic component). The cycloaliphatic radical may include heteroatoms such as nitrogen, sulfur, selenium, silicon and oxygen, or may be composed exclusively of carbon and hydrogen. A cycloaliphatic radical may include one or more functional groups, such as alkyl groups, alkenyl groups, alkynyl groups, halo alkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups and the like. For example, the 4-methylcyclopent-1-yl radical may be a $C_6$ cycloaliphatic radical comprising a methyl group, the methyl group being a functional group, which may be an alkyl group. Similarly, the 2-nitrocyclobut-1-yl radical may be a $C_4$ cycloaliphatic radical comprising a nitro group, the nitro group being a functional group. A cycloaliphatic radical may include one or more halogen atoms, which may be the same or different. Halogen atoms include, for example, fluorine, chlorine, bromine, and iodine. Cycloaliphatic radicals having one or more halogen atoms may include 2-trifluoro methyl cyclohex-1-yl; 4-bromo difluoromethylcyclooct-1-yl; 2-chloro difluoro methyl cyclohex-1-yl; hexafluoro isopropylidene-2,2-bis(cyclohex-4-yl) (—$C_6H_{10}C(CF_3)_2C_6H_{10}$—); 2-chloro methyl cyclohex-1-yl; 3-difluoro methylene cyclohex-1-yloxy; 4-trichloro methyl cyclo hex-1-yloxy; 4-bromo dichloro methyl cyclohex-1-yl thio; 2-bromo ethyl cyclo pent-1-yl; 2-bromo propyl cyclo hex-1-yloxy (e.g. $CH_3CHBrCH_2C_6H_{10}$—); and the like. Further examples of cycloaliphatic radicals may include 4-allyloxy cyclo hex-1-yl; 4-amino cyclohex-1-yl ($H_2NC_6H_{10}$—); 4-amino carbonyl cyclopent-1-yl($NH_2COC_5H_8$—); 4-acetyloxy cyclohex-1-yl; 2,2-dicyano isopropylidene bis(cyclohex-4-yloxy) (—$OC_6H_{10}C(CN)_2C_6H_{10}O$—); 3-methyl cyclo hex-1-yl; methylene bis(cyclohex-4-yloxy) (—$OC_6H_{10}CH_2C_6H_{10}O$—); 1-ethyl cyclo but-1-yl; cyclo propyl ethenyl; 3-formyl-2-tetrahydro furanyl; 2-hexyl-5-tetrahydro furanyl; hexamethylene-1,6-bis(cyclohex-4-yloxy) (—O C$_6$H$_{10}$(CH$_2$)$_6$C$_6$H$_{10}$O—); 4-hydroxy methyl cyclo hex-1-(4-HOCH$_2$C$_6$H$_{10}$—); 4-mercapto methyl cyclo hex-1-yl (4-HSCH$_2$C$_6$H$_{10}$—); 4-methyl thio cyclo hex-1-yl (4-CH$_3$SC$_6$H$_{10}$—); 4-methoxy cyclo hex-1-yl; 2-methoxy carbonyl cyclo hex-1-yloxy(2-CH$_3$OCOC$_6$H$_{10}$O—); 4-nitro methyl cyclo hex-1-yl (NO$_2$CH$_2$C$_6$H$_{10}$—); 3-trimethyl silyl cyclo hex-1-yl; 2-t-butyl dimethyl silyl cyclo pent-1-yl; 4-trimethoxy silyl ethyl cyclo hex-1-yl (e.g. (CH$_3$O)$_3$SiCH$_2$CH$_2$C$_6$H$_{10}$—); 4-vinyl cyclo hexen-1-yl; vinylidene bis(cyclo hexyl); and the like. The term "a C$_3$-C$_{30}$ cycloaliphatic radical" may include cycloaliphatic radicals containing at least three but no more than 30 carbon atoms. The cycloaliphatic radical 2-tetrahydro furanyl(C$_4$H$_7$O—) represents a C$_4$ cycloaliphatic radical. The cyclo hexyl methyl radical (C$_6$H$_{11}$CH$_2$—) represents a C$_7$ cycloaliphatic radical.

An aromatic radical or aromatic moiety, interchangeably, may be an array of atoms having a valence of at least one and having at least one aromatic group. This may include heteroatoms such as nitrogen, sulfur, selenium, silicon and oxygen, or may be composed exclusively of carbon and hydrogen. Suitable aromatic radicals may include phenyl, pyridyl, furanyl, thienyl, naphthyl, phenylene, and biphenyl radicals. The aromatic group may be a cyclic structure having 4n+2 "delocalized" electrons where "n" may be an integer equal to 1 or greater, as illustrated by phenyl groups (n=1), thienyl groups (n=1), furanyl groups (n=1), naphthyl groups (n=2), azulenyl groups (n=2), anthracenyl groups (n=3) and the like. The aromatic radical also may include non-aromatic components. For example, a benzyl group may be an aromatic radical, which may include a phenyl ring (the aromatic group) and a methylene group (the non-aromatic component). Similarly a tetrahydro naphthyl radical may be an aromatic radical comprising an aromatic group (C$_6$H$_3$) fused to a non-aromatic component —(CH$_2$)$_4$—. An aromatic radical may include one or more functional groups, such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical may be a C$_7$ aromatic radical comprising a methyl group, the methyl group being a functional group, which may be an alkyl group. Similarly, the 2-nitrophenyl group may be a C$_6$ aromatic radical comprising a nitro group, the nitro group being a functional group. Aromatic radicals include halogenated aromatic radicals such as trifluoro methyl phenyl, hexafluoro isopropylidene bis(4-phen-1-yloxy) (—OPhC(CF$_3$)$_2$PhO—); chloro methyl phenyl; 3-trifluoro vinyl-2-thienyl; 3-trichloro methyl phen-1-yl (3-CCl$_3$Ph-); 4-(3-bromo prop-1-yl)phen-1-yl(BrCH$_2$CH$_2$CH$_2$Ph-); and the like. Further examples of aromatic radicals may include one or more of 4-allyloxy phen-1-oxy; 4-amino phen-1-yl(H$_2$NPh-); 3-amino carbonyl phen-1-yl(NH$_2$COPh-); 4-benzoyl phen-1-yl; dicyano isopropylidene bis(4-phen-1-yloxy) (—OPhC(CN)$_2$PhO—), 3-methyl phen-1-yl; methylene bis(phen-4-yloxy) (—OPhCH$_2$PhO—), 2-ethyl phen-1-yl; phenyl ethenyl; 3-formyl-2-thienyl; 2-hexyl-5-furanyl; hexamethylene-1,6-bis(phen-4-yloxy) (—OPh(CH$_2$)$_6$PhO—); 4-hydroxy methylphen-1-yl (4-HOCH$_2$Ph-); 4-mercapto methyl phen-1-yl (4-HSCH$_2$Ph-); 4-methyl thio phen-1-yl (4-CH$_3$SPh-); 3-methoxy phen-1-yl; 2-methoxy carbonyl phen-1-yloxy (e.g., methyl salicyl); 2-nitro methyl phen-1-yl(-PhCH$_2$NO$_2$); 3-trimethyl silyl phen-1-yl; 4-t-butyl dimethyl silyl phen-1-yl; 4-vinyl phen-1-yl; vinylidene bis(phenyl); and the like. The term "a C$_3$-C$_{30}$ aromatic radical" may include aromatic radicals containing at least three but no more than 30 carbon atoms. A suitable C$_3$ aromatic radical may include 1-imidazolyl(C$_3$H$_2$N$_2$—). The benzyl radical (C$_7$H$_7$—) represents a C$_7$ aromatic radical.

Figure 2:
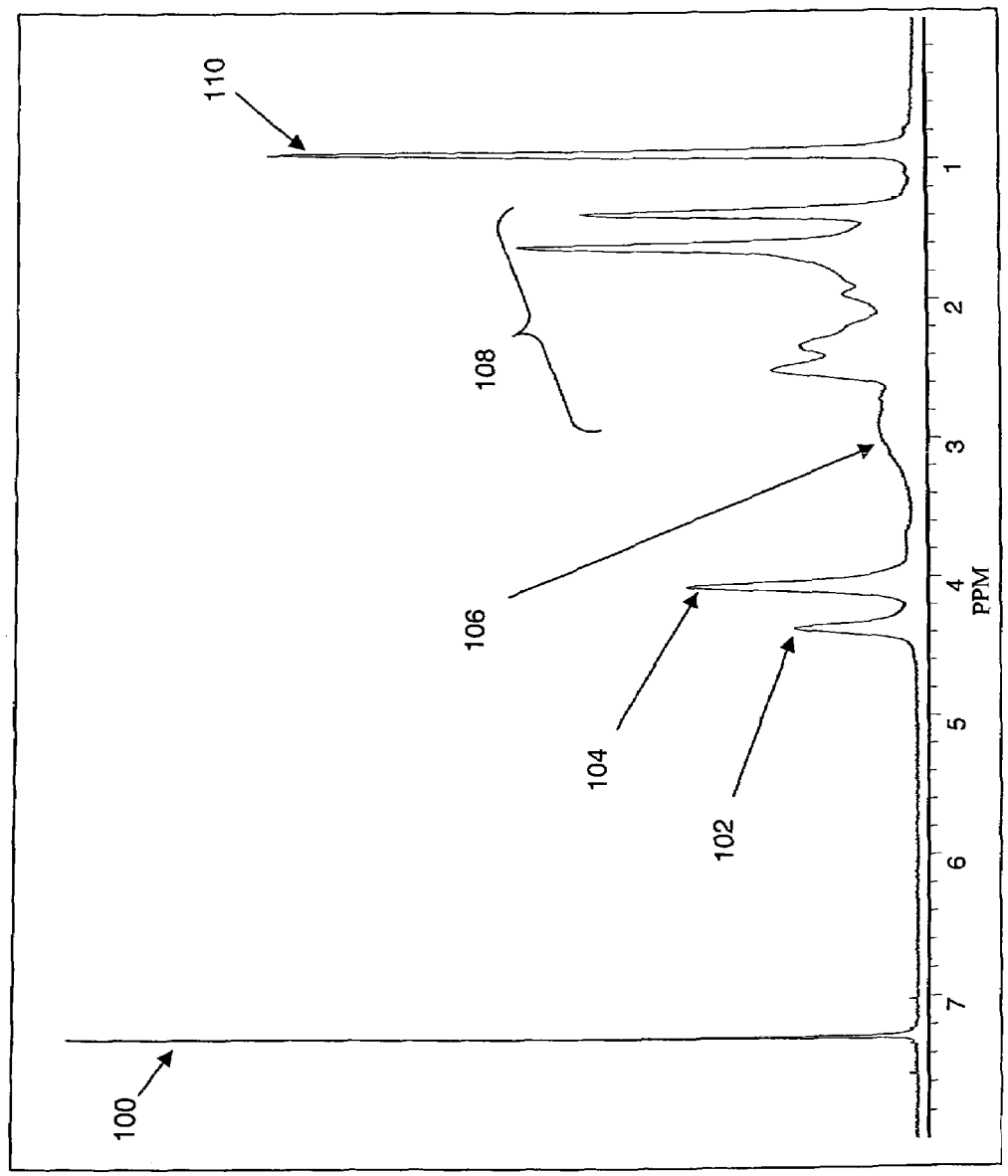
FIG. 2 is an H-NMR spectrum of a composition in accordance with an embodiment of the invention.

FIG. 2 is a graph showing a H-NMR spectrum of a terpolymer according to one embodiment of the invention. A CHCl$_3$ reference standard is indicated by reference number 100. A fluorinated carbon chain (—OCH$_2$—) is indicated by reference number 102; a butyl moiety (—OCH$_2$—) is indicated by reference number 104; a portion (—CH$_2$—) of an itaconic anhydride is indicated by reference number 106; protons in the terpolymer are indicated by the bracket of reference number 108; and a methyl group (—CH$_3$) of a butyl chain is indicated by reference number 110.

The terpolymer may be further functionalized, grafted, and/or cross-linked. In one embodiment, the terpolymer may be copolymerized with a polyether imide, such as the material shown in formula (II).

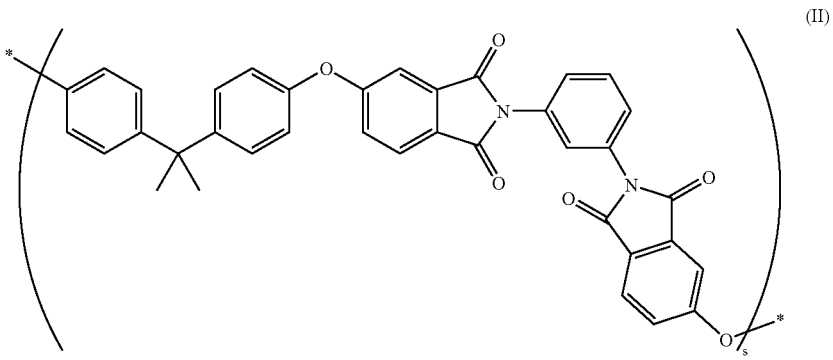

(II)

wherein "s" may be an integer that is equal to or greater than 1.

In one embodiment, the reaction product of the copolymerization may be represented by the structure as shown by formula (III):

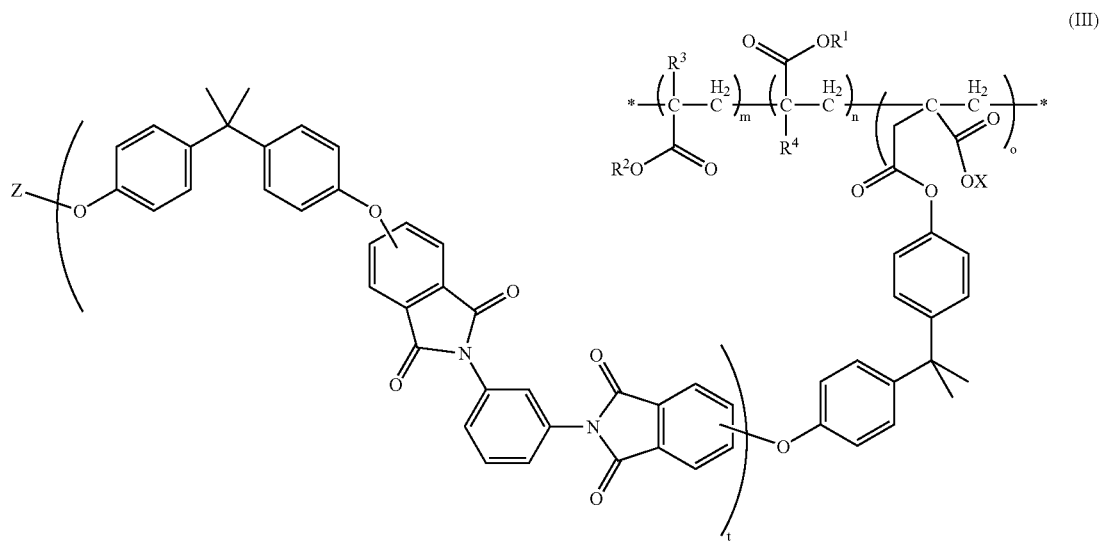

wherein "t" is an integer that may be equal to or greater than 1, "Z" may be an ether or an ester linkage, and "X" may be a hydrogen atom, an alkyl group, or a cation.

The anhydride functionality of the terpolymer may be reacted with, for example, a curing agent. Suitable curing agents may open the anhydride moiety to cross link. In one embodiment, the anhydride group may cross link with a corresponding reaction site on the curing agent. Thus, a multifunctional curing agent may react with a plurality of anhydride moieties from one or more terpolymers to cross link the anhydride moiety and increase the polymer molecular weight.

Suitable curing agents may include free radical initiators, cationic initiators, anionic initiators, and metal catalysts. Suitable free radical initiators may include one or more peroxy esters, peroxy carbonates, hydroperoxides, alkylperoxides, arylperoxides, azo compounds, and the like. For cationic and/or anionic polymerization, suitable curing agents may include one or more organic bases, cationic catalysts, transition metal catalysts, organic acids, and the like can be employed. Exemplary organic bases may include one or more tertiary amines (e.g., N,N-dimethyl aniline, N,N-dimethyl toluidine, N,N-dimethyl-p-anisidine, p-halogeno-N,N-dimethyl anilines, 2-N-ethyl aniline ethanol, tri-n-butyl amine, pyridine, quinoline, N-methyl morpholine, triethanolamine, or the like); imidazoles; or the like. Organic acids may include phenols (e.g., phenol, cresol, xylenol, resorcinol, phloroglucin, or the like), carboxylic acids, anhydrides, or the like. Suitable imidazoles may include one or more of isoimidazole, 2-methyl imidazole, 2-ethyl-4-methylimidazole, 2,4-dimethylimidazole, butylimidazole, 2-heptadecenyl-4-methylimidazole, 2-undecenylimidazole, 1-vinyl-2-undecylimidazole, 2-heptadecylimidazole, 2-phenylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-1-guanaminoethyl-2-methylimidazole, 2-n-heptadecyl-4-methylimidazole, phenylimidazol, benzylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethyl aminophenyl)-4,5-diphenylimidazole, 2-(2-hydroxyphenyl)-4,5-diphenylimidazole, di(4,5-diphenyl-2-imidazole) benzene-1,4,2-naphthyl-4,5-diphenylimidazole, 1-benzyl-2-methylimidazole, 2-p-methoxystyrylimidazole, or 2-phenyl-4,5-dihydroxymethylimidazole. In one embodiment, a suitable imidizole derivative may include trimellitic acid. Suitable other organic acids and organic bases are discussed further hereinbelow.

Exemplary cationic catalysts may include one or more onium salts, iodonium salts, sulfonium salts, or the like. Exemplary metal catalysts may include titanium, zirconium, hafnium, lead, zinc, tin, manganese, nickel, copper, cobalt or the like. Suitable metal catalysts may be in the form of a chelate, a soap, or the like. Examples of such metal catalyst compounds may include metallocenes of titanium, zirconium, or hafnium, lead naphthenate, lead stearate, zinc naphthenate, tin oleate, dibutyl tin maleate, manganese naphthenate, cobalt naphthenate, lead salt of resin acid, or metal chlorides (such as $ZnCl_2$, $SnCl_4$ or $AlCl_3$), or the like.

Other suitable curing agents may include carboxylic acids, such as aliphatic dicarboxylic acids, cycloaliphatic dicarboxylic acids, and aromatic dicarboxylic acids. The molecular weight of the dicarboxylic acid may be less than about 300, in a range of from about 300 to about 500, from about 500 to about 1000, or greater than about 1000. As used herein, the term 'carboxylic acids' includes carboxylic acids, and equivalents of carboxylic acids, having two or more functional carboxyl groups, or groups which perform like carboxylic acids in reaction with glycols and diols in forming polyesters. These equivalents may include esters and ester-forming reactive derivatives, such as acid halides and anhydrides. The molecular weight preference mentioned above pertains to the acid rather than the equivalent ester or ester-forming derivatives.

Aliphatic dicarboxylic acids refer to carboxylic acids having two carboxyl groups each of which is attached to a saturated carbon atom. If the carbon atom to which the carboxyl group is attached is saturated and is in a ring, the acid is cycloaliphatic. Aromatic dicarboxylic acids refer to dicarboxylic acids having two carboxyl groups each of which is attached to a carbon atom in an isolated or fused benzene ring system. It is not necessary that both functional carboxyl groups be attached to the same aromatic ring.

Other suitable curing agents may include aliphatic acids and cycloaliphatic acids. In one embodiment, aliphatic acids and cycloaliphatic acids may include one or more of sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1,2-dicarboxylic acid, 2-ethysuberic acid, tetramethylsuccinic acid, cyclopentanedicarboxylic acid, decahydro-1,5 naphthalene dicarboxylic acid, 4,4'-bicyclohexyl dicarboxylic acid, decahydro-2,6 naphthalene dicarboxylic acid, 4,4 methylenebis (cyclohexane carboxylic acid), 3,4-furan dicarboxylic acid, or 1,1-cyclobutane dicarboxylic acid.

Suitable aromatic dicarboxylic acids may include one or more of terephthalic acid; phthalic acid; isophthalic acid; bi-benzoic acid; bis(p-carboxyphenyl)methane; oxybis benzoic acid; ethylene-1,2-bis p-oxybenzoic acid; 1,5-naphthalene dicarboxylic acid; 2,6-naphthalene dicarboxylic acid; 2,7-naphthalene dicarboxylic acid; phenanthrene dicarboxylic acid; anthracene dicarboxylic acid; 4,4'-sulfonyl dibenzoic acid; and halo and $C_1$-$C_{12}$ alkyl, alkoxy, and aryl ring substitution derivatives thereof. Hydroxy acids such as p (beta-hydroxy ethoxy)benzoic acid may be used in conjunction with an aromatic dicarboxylic acid.

Suitable curing agents may include polyfunctional amines, such as diamines. In one embodiment, the diamine may include one or both of 2,2'-(ethylene dioxy)diethylamine or hexamethylene diamine. In one embodiment, the diamine may include one or more of N,N'-bis-(2-butyl)-p-methylene dianiline; N,N'-bis-4-(5-methyl-2-butyl)-p-phenylene diamine; N,N'-bis-4-(2-butyl)-p-phenylene diamine; N-2-pentyl —N'-phenyl-p-phenylene diamine, or N,N'-bis 4-(2-methylpropyl)-o-phenylene diamine.

Other suitable polyfunctional amines may include one or more of 4,4'-diamino diphenylmethane; o-, m-, or p-phenylene diamine; bis(4-(3-amino phenoxy)phenyl)sulfone; 2,4-diamino toluene; 2,5-diamino toluene; 2,4-diamino xylene; 2,4-diamino durene; dialkyl 4,4'-diamino diphenyls, such as dimethyl-4,4'-diamino diphenyl; dialkoxy-4,4'-diamino diphenyl, such as dimethoxy-4,4'-diamino diphenyl or diethoxy 4,4'-diamino diphenyl; 4,4'-diamino diphenyl ether; 3,4'-diamino diphenyl ether; 4,4'-diamino diphenyl sulfone; 3,3'-diamino diphenyl sulfone; 4,4'-diamino benzophenone; 3,3'-diamino benzophenone; 1,3-bis(3-amino phenoxy)benzene; 1,3-bis(4-amino phenoxy)benzene; 1,4-bis(4-amino phenoxy)benzene; 4,4'-bis(4-amino phenoxy) biphenyl; bis(4-(4-amino phenoxy)phenyl)sulfone; 2,2'-bis (4-(4-amino phenoxy)phenyl)propane; 2,2-bis(4-(4-amino phenoxy)phenyl)hexafluoro propane; 2,2-bis(4-(3-amino phenoxy)phenyl)propane; 2,2-bis(4-(3-amino phenoxy)phenyl)hexafluoro propane; 2,2-bis(4-(4-amino-2-trifluoromethyl phenoxy)phenyl)hexafluoro propane; 2,2-bis(4-(3-amino-5-trifluoro methylphenoxy)phenyl)hexafluoro propane; 2,2-bis(4-amino phenyl)hexafluoro propane; 2,2-bis(3-amino phenyl)hexafluoro propane; 2,2-bis (3-amino-4-hydroxyphenyl)hexafluoro propane; 2,2-bis(3-amino-4-methylphenyl)hexafluoro propane; 4,4'-bis(4-amino phenoxy)octafluoro biphenyl; 2,2'-bis(trifluoro methyl)diamino diphenyl; 3,5-diamino benzotrifluoride; 2,5-diamino benzo trifluoride; 3,3'-bis trifluoro methyl-4,4'-diamino biphenyl; 3,3'-bis trifluoro methyl-5,5'-diamino biphenyl; bis(trifluoro methyl)-4,4'-diamino diphenyl; bis(fluorinated alkyl)-4,4'-diamino diphenyls; dichloro-4,4'-diamino diphenyl; dibromo-4,4'-diamino diphenyl; bis(fluorinated alkoxy)-4,4'-diamino diphenyls; diphenyl-4,4'-diamino diphenyl; 4,4'-bis(4-amino tetrafluoro phenoxy) tetrafluoro benzene; 4,4'-bis(4-amino tetrafluoro phenoxy)octafluoro biphenyl; 4,4'-binaphthyl amine; 4,4'-diamino benzanilide; or 4,4'-diamino(N-alkyl) benzanilides. Other suitable polyfunctional amines may include one or more aminosiloxane or aminosilane, such as 1,3-bis(3-amino propyl)-1,1,2,2-tetramethyl disiloxane, 1,3-bis(3-amino butyl)-1,1,2,2-tetramethyl disiloxane, bis(4-amino phenoxy)dimethylsilane, or 1,3-bis(4-amino phenoxy)tetramethyl disiloxane. In one embodiment, the polyfunctional curing agent may include a polyfunctional azo compound. In one embodiment, the curing agent may consist essentially of 2,2'-(ethylene dioxy) diethylamine. In one embodiment, the curing agent may consist essentially of hexamethylene diamine.

An otherwise hydrophobic sheet may be rendered relatively more hydrophilic by a treatment with a composition according to an embodiment of the invention. The sheet may be porous, and as such may be referred to as a base membrane. As used herein, a base membrane may refer to an uncoated membrane, while the more general term of membrane may refer to a membrane that comprises an embodiment of the invention, unless language or context indicates otherwise.

The base membrane may be rendered permeable by one or more of perforating, stretching, expanding, bubbling, or extracting the base membrane, for example. Suitable methods of making the membrane also may include foaming, skiving or casting any of the suitable materials. In alternate embodiments, the membrane may be formed from woven or non-woven fibers.

In one embodiment, continuous pores may be produced. Suitable porosity may be in a range of greater than about 10 percent. In one embodiment, the porosity may be in a range of from about 10 percent to about 20 percent, from about 20 percent to about 30 percent, from about 30 percent to about 40 percent, from about 40 percent to about 50 percent, from about 50 percent to about 60 percent, from about 60 percent to about 70 percent, from about 70 percent to about 80 percent, from about 80 percent to about 90 percent, or greater than about 90 percent. Here and throughout the specification and claims, range limitations may be combined and/or interchanged, such ranges are identified and include all the sub-ranges contained therein unless context or language indicates otherwise.

Pore diameter may be uniform, or may be in a predetermined pattern. Suitable pore diameters may be less than about 50 micrometers. In one embodiment, an average pore diameter may be in a range of from about 50 micrometers to about 40 micrometers, from about 40 micrometers to about 30 micrometers, from about 30 micrometers to about 20 micrometers, from about 20 micrometers to about 10 micrometers, from about 10 micrometers to about 1 micrometer. In one embodiment, the average pore diameter may be less than about 1 micrometer, in a range of from about 1 micrometer to about 0.5 micrometers, from about 0.5 micrometers to about 0.25 micrometers, from about 0.25 micrometers to about 0.1 micrometers, or less than about 0.1 micrometers. In one embodiment, the average pore diameter may be in a range of from about 0.1 micrometers to about 0.01 micrometers.

In one embodiment, the base membrane may be a three-dimensional matrix or have a lattice type structure including plurality of nodes interconnected by a plurality of fibrils. Surfaces of the nodes and fibrils may define a plurality of pores in the membrane. The size of a fibril that has been at least partially sintered may be in a range of from about 0.05 micrometers to about 0.5 micrometers in diameter taken in a direction normal to the longitudinal extent of the fibril. The specific surface area of the porous membrane may be in a range of from about 9 square meters per gram of membrane material to about 110 square meters per gram of membrane material.

Surfaces of nodes and fibrils may define numerous interconnecting pores that extend through the membrane between opposite major side surfaces in a tortuous path. In one embodiment, the average effective pore size of pores in the membrane may be in the micrometer range. A suitable average effective pore size for pores in the membrane may be in a range of from about 0.01 micrometers to about 0.1 micrometers, from about 0.1 micrometers to about 5 microns, from about 5 micrometers to about 10 micrometers, or greater than about 10 micrometers.

In one embodiment, the base membrane may be made by extruding a mixture of fine powder particles and lubricant. The extrudate subsequently may be calendered. The calendered extrudate may be "expanded" or stretched in one or more directions, to form fibrils connecting nodes to define a three-dimensional matrix or lattice type of structure. "Expanded" means stretched beyond the elastic limit of the material to introduce permanent set or elongation to fibrils. The membrane may be heated or "sintered" to reduce and minimize residual stress in the membrane material by changing portions of the material from a crystalline state to an amorphous state. In one embodiment, the membrane may be unsintered or partially sintered as is appropriate for the contemplated end use of the membrane.

In one embodiment, the base membrane may define many interconnected pores that fluidly communicate with environments adjacent to the opposite facing major sides of the membrane. The propensity of the material of the membrane to permit a liquid material, for example, an aqueous liquid material, to wet out and pass through pores may be expressed as a function of one or more properties. The properties may include the surface energy of the membrane, the surface tension of the liquid material, the relative contact angle between the material of the membrane and the liquid material, the size or effective flow area of pores, and the compatibility of the material of the membrane and the liquid material.

Membranes according to embodiments of the invention may have differing dimensions, some selected with reference to application-specific criteria. In one embodiment, the membrane may have a thickness in the direction of fluid flow in a range of less than about 10 micrometers. In another embodiment, the membrane may have a thickness in the direction of fluid flow in a range of greater than about 10 micrometers, for example, in a range of from about 10 micrometers to about 100 micrometers, from about 100 micrometers to about 1 millimeter, from about 1 millimeter to about 5 millimeters, or greater than about 5 millimeters.

Perpendicular to the direction of fluid flow, the membrane may have a width of greater than about 10 millimeters. In one embodiment, the membrane may have a width in a range of from about 10 millimeters to about 45 millimeters, from about 45 millimeters to about 50 millimeters, from about 50 millimeters to about 10 centimeters, from about 10 centimeters to about 100 centimeters, from about 100 centimeters to about 500 centimeters, from about 500 centimeters to about 1 meter, or greater than about 1 meter. The width may be a diameter of a circular area, or may be the distance to the nearest peripheral edge of a polygonal area. In one embodiment, the membrane may be rectangular, having a width in the meter range and an indeterminate length. That is, the membrane may be formed into a roll with the length determined by cutting the membrane at predetermined distances during a continuous formation operation.

In one embodiment, the coating forms a layer having an average thickness in a range of from about 1 nanometer to about 500 nanometers, from about 500 nanometers to about 1 micrometer, or greater than about 1 micrometer. The coating layer may be uniform in thickness, or may have a thickness that differs from area to area.

A membrane prepared according to embodiments of the invention may have one or more predetermined properties. Such properties may include one or more of a wetability of a dry-shipped membrane, a wet/dry cycling ability, filtering of polar liquid or solution, flow of non-aqueous liquid or solution, flow and/or permanence under low pH conditions, flow and/or permanence under high pH conditions, flow and/or permanence at room temperature conditions, flow and/or permanence at elevated temperature conditions, flow and/or permanence at elevated pressures, transparency to energy of predetermined wavelengths, transparency to acoustic energy, or support for catalytic material. Permanence refers to the ability of the coating material to maintain function in a continuing manner, for example, for more than 1 day or more than one cycle (wet/dry, hot/cold, high/low pH, and the like).

A property of at least one embodiment may include a resistance to temperature excursions in a range of from about 100 degrees Celsius to about 125 degrees Celsius, for example, in autoclaving operations. Optionally, the temperature excursion may be at an elevated pressure relative ambient. In one embodiment, resistance to ultraviolet (UV) radiation may allow for sterilization of the membrane without loss of properties. Of note is an alternative embodiment in which cross-linking of the coating composition may be initiated or facilitated by exposure to an irradiation source, such as a UV source, where UV initiators may compete with UV absorbing compositions, if present.

Flow rate of fluid through the membrane may be dependent on one or more factors. The factors may include one or more of the physical and/or chemical properties of the membrane, the properties of the fluid (e.g., viscosity, pH, solute, and the like), environmental properties (e.g., temperature, pressure, and the like), and the like. In one embodiment, the membrane may be permeable to vapor rather than, or in addition to, fluid or liquid. A suitable vapor transmission rate, where present, may be in a range of less than about 1000 grams per square meter per day ($g/m^2/day$), from about 1000 $g/m^2/day$ to about 1500 $g/m^2/day$, from about 1500 $g/m^2/day$ to about 2000 $g/m^2/day$, or greater than about 2000 $g/m^2/day$. In one embodiment, the membrane may be selectively impermeable to vapor, while remaining permeable to liquid or fluid.

The membrane may be used to filter water. In one embodiment, the water may flow through the membrane at flow rate that is greater than about 5 mL/min-cm at a pressure differential of 27 inches Hg at room temperature after 10 wet/dry cycles. In one embodiment, the water may flow through the membrane at flow rate that is greater than about 5 mL/min-cm at a pressure differential of 27 inches Hg at about 100 degrees Celsius after 10 wet/dry cycles. In one embodiment, the water may flow through the membrane at flow rate that is greater than about 10 mL/min-cm at a pressure differential of 27 inches Hg at room temperature after 10 wet/dry cycles. In one embodiment, the water may flow through the membrane at flow rate that is greater than about 10 mL/min-cm at a pressure differential of 27 inches Hg at 100 degrees Celsius after 10 wet/dry cycles. In one embodiment, the water may flow through the membrane at flow rate that is greater than about 20 mL/min-cm at a pressure differential of 27 inches Hg at room temperature after 10 wet/dry cycles. In one embodiment, the water may flow through the membrane at flow rate that is greater than about 20 mL/min-cm at a pressure differential of 27 inches Hg at about 100 degrees Celsius after 10 wet/dry cycles. In one embodiment, the water may flow through the membrane at flow rate that is greater than about 5 mL/min-cm at a pressure differential of 27 inches Hg at room temperature after 20 wet/dry cycles. In one embodiment, the water may flow through the membrane at flow rate that is greater than about 5 mL/min-cm at a pressure differential of 27 inches Hg at 100 degrees Celsius after 20 wet/dry cycles. In one embodiment, the water may flow through the membrane at flow rate that is greater than about 10 mL/min-cm at a pressure differential of 27 inches Hg at room temperature after 20 wet/dry cycles. In one embodiment, the water may flow through the membrane at flow rate that is greater than about 10 mL/min-cm at a pressure differential of 27 inches Hg at 100 degrees Celsius after 20 wet/dry cycles. In one embodiment, the water may flow through the membrane at flow rate that is greater than about 20 mL/min-cm at a pressure differential of 27 inches Hg at room temperature after 50 wet/dry cycles.

In one embodiment, the membrane may be absorbent, such as water or bodily fluid absorbent. Absorbent may include insignificant amounts of fluid influx and outflow when maintaining equilibrium with a fluidic environment. However, absorbent is distinguishable, and distinguished from, flowable. Flow includes an ability of liquid or fluid to flow from a first surface through the membrane and out a second surface. Thus, in one embodiment, the membrane may be operable to have a liquid or fluid flow through at least a portion of the material in a predetermined direction. The motive force may be osmotic or wicking, or may be driven by one or more of a concentration gradient, pressure gradient, temperature gradient, or the like.

The membrane may have a plurality of sub layers. The sub layers may be the same as, or different from, each other. In one aspect, one or more sub layer may include an embodiment of the invention, while another sub layer may provide a property such as, for example, reinforcement, selective filtering, flexibility, support, flow control, and the like.

A membrane according to embodiments of the invention may be used as, for example, a proton exchange membrane (PEM) in a fuel cell. Other suitable applications may include liquid filtration, polarity-based chemical separations, electrolysis, batteries, pervaporization, gas separation, dialysis separation, industrial electrochemistry such as chloralkali production and electrochemical applications, super acid catalysts, or use as a medium in enzyme immobilization.

In one embodiment, a hydrophilic porous expanded polytetrafluoroethylene (ePTFE) membrane may be prepared by treating a virgin ePTFE membrane with a hydrophilic precursor acrylate terpolymer. After the treatment, the terpolymer may be cross-linked using a diamine. Such cross-linking may mechanically interlock the coating onto fibrils and nodes of the ePTFE porous network. During cross-linking, the hydrophilicity of the hydrophilic precursor acrylate terpolymer may be activated by a reaction between itaconic anhydride units on the terpolymer backbone with the curing agent, such as a diamine. The activation may include generating carboxylic acid groups and inter- and intra-molecular ion pairs. Consequently, the coated ePTFE membrane may be rendered liquid water wetability. The wetability of this coated ePTFE membrane may be retained during wet/dry cycling of the membrane.

EXAMPLES

The following examples only illustrate methods and embodiments in accordance with the invention, and do not impose limitations upon the claims. Unless specified otherwise, all ingredients are commercially available from such common chemical suppliers as Alpha Aesar, Inc. (Ward Hill, Mass.), Sigma-Aldrich Company (St. Louis, Mo.), and the like.

Example 1

Preparation of Terpolymer Composition

A solution of 3,3,4,4,5,5,6,6,7,7,8,8,9,9,10,10,10-heptadecafluorodecyl acrylate (4.043 grams (g), 7.8 millimoles (mmol)), itaconic anhydride (0.875 g; 7.8 mmol), butyl acrylate (2 g; 15.6 mmol), 2,2'-azobis(2-methylpropionitrile) (AIBN) (0.0138 g, 0.08 mmol), and tetrahydrofuran (10 g, 138.7 mmol) are placed in a 250 milliliter (mL) Chemglass Airfree tube. The solution is degassed by freeze-pump-thaw (3 cycles) under nitrogen. The degassed solution is polymerized at 60 degrees Celsius for 24 hours (h). The reaction product is cooled to room temperature and precipitated from heptane (150 mL) under vigorous stirring.

The reaction product is a terpolymer that may have a molar ratio of a=1, b=2, and z=2 assembled in a random orientation, and an average molecular weight (Mw) in a range of from about 5,000 to about 200,000. A schematic of the reaction scheme is illustrated below. The terpolymer is soluble in a moderately polar solvent such as acetone, but is relatively insoluble in a polar-protic solvent, such as methanol. Unreacted itaconic anhydride is soluble in both acetone and methanol. After precipitation in a non-polar solvent, a polar solvent wash allows for recovery of the terpolymer without unreacted anhydride.

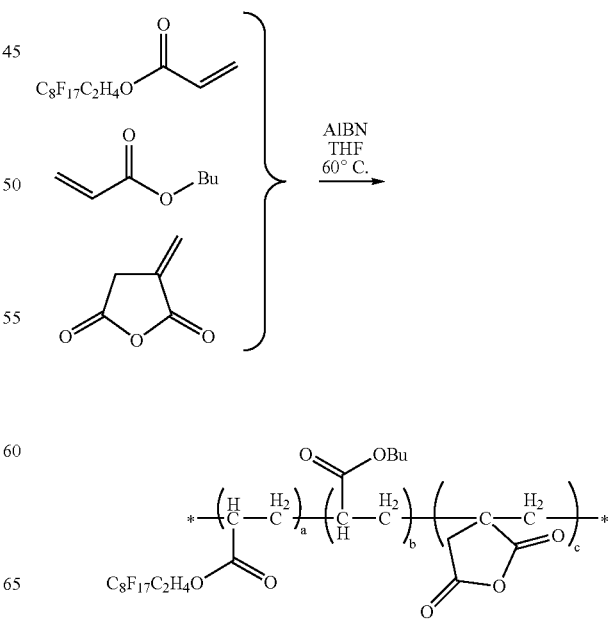

Example 2

Preparation of Terpolymer Composition

A solution of 3,3,4,4,5,5,6,6,7,7,8,8,9,9,10,10,10-heptadecafluorodecyl acrylate (4.043 grams (g), 7.8 millimoles (mmol)), itaconic anhydride (1.747 g; 15.6 mmol), butyl acrylate (1 g; 7.8 mmol), 2,2'-azobis(2-methylpropionitrile) (AIBN) (0.0136 g, 0.08 mmol), and tetrahydrofuran (13.3 mL, 184.4 mmol) are placed in a 250 milliliter (mL) Chemglass Airfree tube. The solution is degassed by freeze-pump-thaw (3 cycles) under nitrogen. The degassed solution is polymerized at 60 degrees Celsius for 24 hours (h). The reaction product is cooled to room temperature and precipitated from heptane (150 mL) under vigorous stirring. H-NMR analysis indicates that a relatively large yield of the isolated composition is itaconic anhydride with a portion of terpolymer present. The precipitate is dissolved in acetone and reprecipitated from methanol to afford a white powder.

Analysis indicates that the terpolymer is a major component of the second precipitated product. The itaconic anhydride remains in the methanol/acetone solution.

Example 3

Preparation of Terpolymer Composition

A solution of 3,3,4,4,5,5,6,6,7,7,8,8,9,9,10,10,10-heptadecafluorodecyl acrylate (4.043 grams (g), 7.8 millimoles (mmol)), itaconic anhydride (1.75 g; 15.6 mmol), butyl acrylate (2 g; 15.6 mmol), 2,2'-azobis(2-methylpropionitrile) (AIBN) (0.0068 g, 0.08 mmol), and tetrahydrofuran (17.8 g, 246.8 mmol) are placed in a 250 milliliter (mL) Chemglass Airfree tube. The solution is degassed by freeze-pump-thaw (3 cycles) under nitrogen. The degassed solution is polymerized at 60 degrees Celsius for 24 hours (h). The reaction product is cooled to room temperature and precipitated from heptane (150 mL) under vigorous stirring. H-NMR analysis indicates that a relatively large yield of the isolated composition is itaconic anhydride with a portion of terpolymer present. The precipitate is dissolved in acetone and reprecipitated from methanol to afford a white powder.

Analysis indicates that the second precipitated product is largely the terpolymer. The itaconic anhydride remains in the methanol/acetone solution. The yield amount indicates that varying the relative proportions of starting ingredients impacts yield. Further, small changes in the proportions have a large impact on yield. Another method of reducing the level of unreacted itaconic anhydride is to use a variable feed rate to introduce the corresponding monomer into the reaction, rather than a one pot process.

Example 4

Treatment of Membrane

Eight virgin expanded polytetrafluoroethylene (ePTFE) membranes are treated with the solution from Example 1 and a curing agent solution. The curing agent solution includes 2,2'-(ethylenedioxy)diethylamine and hexamethylenediamine. The curing agent is added in an amount sufficient to have a 1:1 stoichiometrically balanced ratio based on functionality relative to the anhydride moiety. The coated membranes are heated to cross-link the terpolymer from Example 1, and to form an interlocking coating on the treated membrane.

Under observation, the treated membranes samples readily wet out when contacted with liquid water. The initial water flow rate is evaluated. Four of the samples are subjected to five wet/dry cycles using water at 22 degrees Celsius. The samples all continued to flow water there through after the cycling.

Another four of the samples are subjected to wet/dry cycles using water at 100 degrees Celsius. The samples continue to flow water there through after at least 3 hot water wet/dry test cycles at 1 liter per cycle. Various subsequent flow rates are observed. The flow rates range from 1 mL/min-cm$^2$ to 23 mL/min-cm$^2$ at 27 Hg pressure differential.

The embodiments described herein are examples of compositions, structures, systems and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A copolymer comprising polyether imide and a composition comprising a terpolymer having the structure of formula (I)

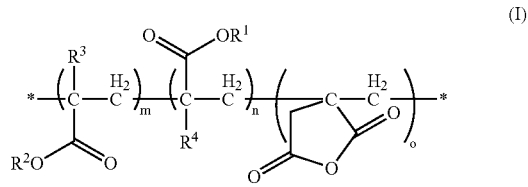

wherein R1 comprises an alkyl radical; R2 comprises of a formula $CF_3(CF_2)p(CH_2)q$- wherein "p" is an integer in a range of from 1 to about 21, and "q" is an integer in a range of from 1 to about 10; R3 and R4 are separately hydrogen or a short chain alkyl; and "m" is an integer areater than 1, "n" is an integer greater than about 2 to about 20,000, and "o" is an integer greater than about 2.

2. The copolymer as defined in claim 1, wherein the polyether imide comprises the structure as shown in formula (II):

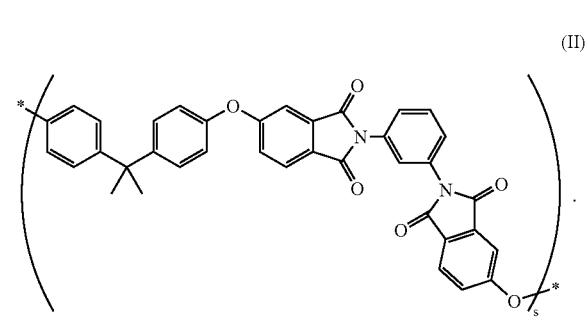

3. A copolymer comprising the reaction product of a polysulfone and a composition comprising a terpolymer having the structure of formula (I)

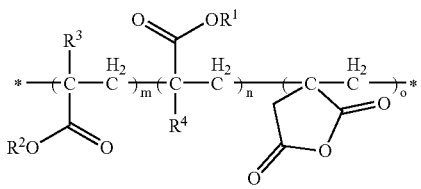

wherein R1 comprises an alkyl radical; R2 comprises of a formula $CF_3(CF_2)_p(CH_2)_q$- wherein "p" is an integer in a range of from 1 to about 21, and "q" is an integer in a range of from 1 to about 10; R3 and R4 are separately hydrogen or a short chain alkyl; and "m" is an integer greater than 1, "n" is an integer greater than about 2 to about 20,000, and "o" is an integer greater than about 2.

4. A cured or cross-linked material formed from the mixture as defined in claim 1.

5. A fluorine substituted oligomeric or polymeric ester comprising the reaction product of:
 a fluorine substituted acrylate or a fluorine substituted methacrylate;
 an unsaturated anhydride; and
 an alkyl acrylate or an alkyl methacrylate.

6. The fluorine substituted oligomeric or polymeric ester as defined in claim 5, wherein the unsaturated anhydride itaconic anhydride or maleic anhydride.

7. The fluorine substituted oligomeric or polymeric ester as defined in claim 6, wherein the itaconic anhydride is present in an amount in a range of greater than about 20 mole percent.

8. The fluorine substituted oligomeric or polymeric ester as defined in claim 5 wherein the itaconic anhydride is present in an amount of about 25 mole percent.

9. The fluorine substituted oligomeric or polymeric ester as defined in claim 5, wherein the fluorine substituted acrylate comprises 3,3,4,4,5,5,6,6,7,7,8,8,9,9,10,10,10-heptadecafluorodecyl acrylate.

10. The fluorine substituted oligomeric or polymeric ester as defined in claim 5, wherein the fluorine substituted acrylate is present in an amount in a range of greater than about 20 mole percent.

11. The fluorine substituted oligomeric or polymeric ester as defined in claim 10, wherein the fluorine substituted acrylate is present in an amount of about 25 mole percent.

12. The fluorine substituted oligomeric or polymeric ester as defined in claim 5, wherein the alkyl acrylate is present in an amount in a range of greater than about 35 mole percent.

13. The fluorine substituted oligomeric or polymeric ester as defined in claim 12, wherein the alkyl acrylate is present in an amount of about 50 mole percent.

14. The fluorine substituted oligomeric or polymeric ester as defined in claim 5, wherein the alkyl acrylate comprises butyl acrylate.

15. The fluorine substituted oligomeric or polymeric ester as defined in claim 5, further comprising residual amounts of an azo-based free radical polymerization initiator.

16. A copolymer comprising the reaction product of polyether imide and the fluorine substituted oligomeric or polymeric ester as defined in claim 5.

17. A mixture comprising a polyfunctional cross-linking agent and the fluorine substituted oligomeric or polymeric ester as defined in claim 5.

18. The mixture as defined in claim 17, wherein the cross-linking agent comprises a polyfunctional amine.

19. The mixture as defined in claim 18, wherein the polyfunctional amine comprises one or both of 2,2'-(ethylenedioxy) diethylamine or hexamethylenediamine.

20. The mixture as defined in claim 18, wherein:
 the fluorine substituted acrylate consists essentially of 3,3,4,4,5,5,6,6,7,7,8,8,9,9,10,10,10-heptadecafluorodecyl acrylate; and
 the alkyl acrylate consists essentially of butyl acrylate.

21. An article comprising the cured product of the mixture as defined claim 17.

22. A method, comprising:
 reacting a fluorine substituted acrylate or a fluorine substituted methacrylate; an unsaturated anhydride; an alkyl acrylate or an alkyl methacrylate; and an initiator in a solvent.

23. The method as defined in claim 22, wherein the solvent comprises tetrahydrofuran.

24. The method as defined in claim 22, wherein the fluorine substituted acrylate comprises 3,3,4,4,5,5,6,6,7,7,8,8,9,9,10,10,10-heptadecafluorodecyl acrylate.

25. The method as defined in claim 22, wherein the alkyl acrylate comprises butyl acrylate.

26. The method as defined in claim 22, wherein the initiator comprises an azo-based free radical polymerization initiator.

27. The method as defined in claim 26, wherein the initiator comprises 2,2'-azobisisobutyronitrile.

28. The method as defined in claim 22, wherein reacting comprises free radical polymerization to form a terpolymer.

29. The method as defined in claim 28, further comprising contacting the terpolymer to polyfunctional cross-linking agent.

30. The method as defined in claim 29, wherein the cross-linking agent comprises one or both of 2,2'-(ethylenedioxy)diethylamine or hexamethylenediamine.

31. The method as defined in claim 29, further comprising curing the terpolymer to form a cross-linked article.

32. The method as defined in claim 31, wherein curing comprises applying thermal energy to increase the temperature of the curing agent and the terpolymer to be at a temperature of about 130 degrees Celsius.

33. The method as defined in claim 31, wherein curing comprises generating a network of hydrophlic functionality such as carboxylic acid groups and inter/intramolecular ammonium-carboxylate ion pairs to enhance hydrophilicity.

* * * * *